Aug. 6, 1940.  G. L. USSELMAN  2,210,050
ELECTRIC CONDENSER
Filed June 21, 1938  3 Sheets-Sheet 1
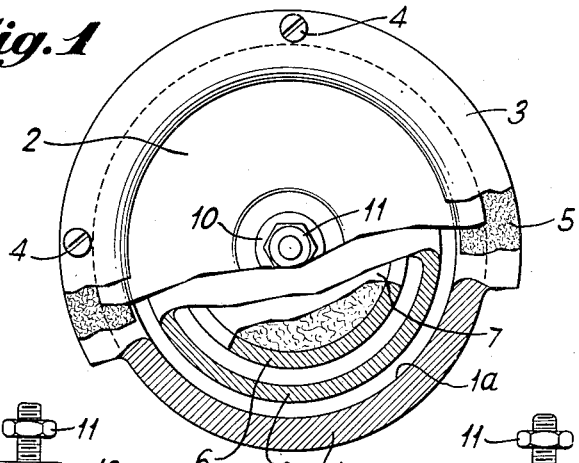
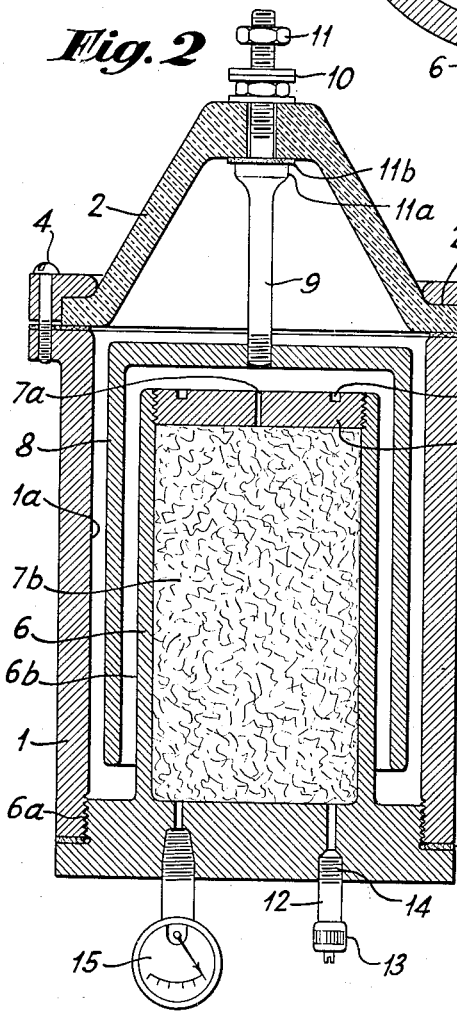
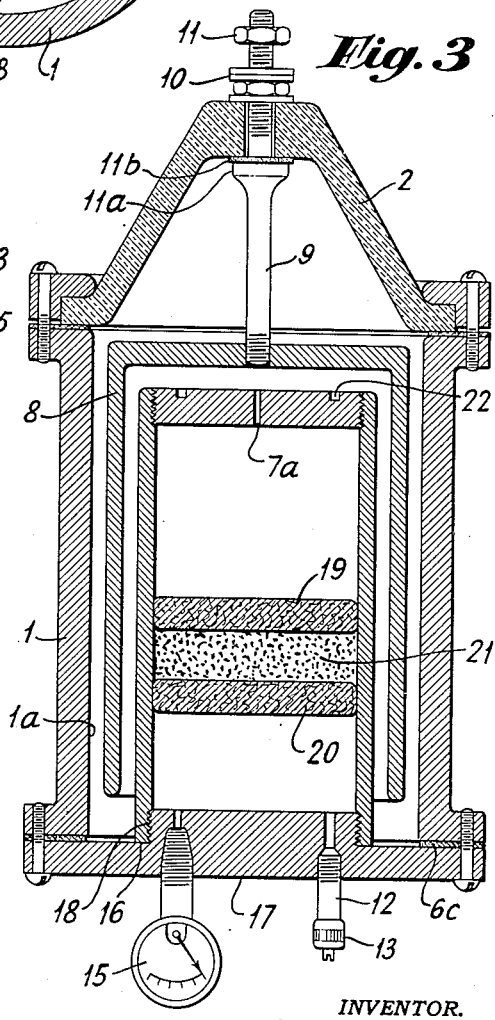
INVENTOR.
GEORGE L. USSELMAN
BY
ATTORNEY.

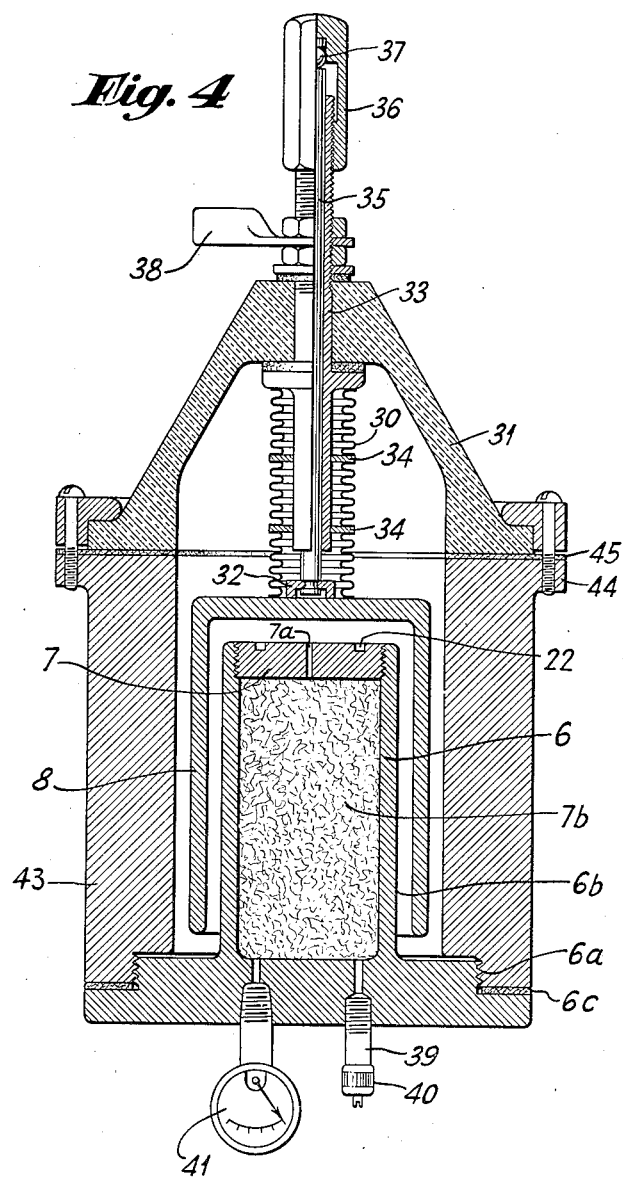

Aug. 6, 1940.   G. L. USSELMAN   2,210,050
ELECTRIC CONDENSER
Filed June 21, 1938   3 Sheets-Sheet 3

INVENTOR.
GEORGE L. USSELMAN
BY
ATTORNEY.

Patented Aug. 6, 1940

2,210,050

UNITED STATES PATENT OFFICE 2,210,050

ELECTRIC CONDENSER

George L. Usselman, Port Jefferson, N. Y., assignor to Radio Corporation of America, a corporation of Delaware Application June 21, 1938, Serial No. 214,859

12 Claims. (Cl. 175—41)

This invention relates to a new and novel compressed air condenser having air storage and filtering means.

An object of this invention is to provide further improvements in compressed air condensers of the type disclosed in the Hansell et al. Patent 2,192,062, issued Feb. 27, 1940, and my copending application Serial No. 178,022, filed Dec. 4, 1937.

Another object of this invention is to improve compressed air condensers having air storage means by providing a self-contained filter within the condenser structure.

A further object of this invention is to increase the capacity by so arranging the air storage and filter container within the casing that it also acts as an additional electrode surface to increase the condenser capacity.

Still another object of this invention is to provide electrodes with movable surfaces to change the capacity by a change in area.

A still further object of this invention is to prevent moisture and foreign substances from entering into the condenser, thus resulting in damage to the condenser structure.

A feature of this invention is the novel arrangement of the electrodes, the air storage being constructed so that they may be easily removable to clean out or replace the filtering material. I have found that when condensers of the compressed fluid type have been in use for some time, moisture and dust accumulate on the electrode surfaces, which lowers their breakdown voltage and greatly impairs the general overall efficiency of the condenser. The cause of dust and moisture entering the condenser is from numerous sources, the most outstanding one being that of objectionable substances, such as dust, oil and grease, entering the condenser at the time when fluid is pumped in the condenser. It has also been found that the flexible hose connecting the condenser and the pump gives off small dust particles of sulphur and other ingredients employed in the manufacture of the rubber. One might suggest to overcome such entry of objectionable substances filtering the fluid or air before it enters the inside of the condensers by placing suitable filtering means in series between the condenser and the pump, but practical engineering experience proves that such a method cannot be relied upon, as regardless of instructions to the user, condensers are frequently damaged.

This invention will best be understood by referring to the accompanying drawings, in which:

Fig. 1 shows a plan view partly in section of a condenser of this invention;

Fig. 2 is a longitudinal section of the condenser shown in Fig. 1;

Fig. 3 is a longitudinal section of another modification of this invention;

Fig. 4 is a longitudinal section of a condenser of this invention having means for varying the capacity of the condenser.

Figure 5:
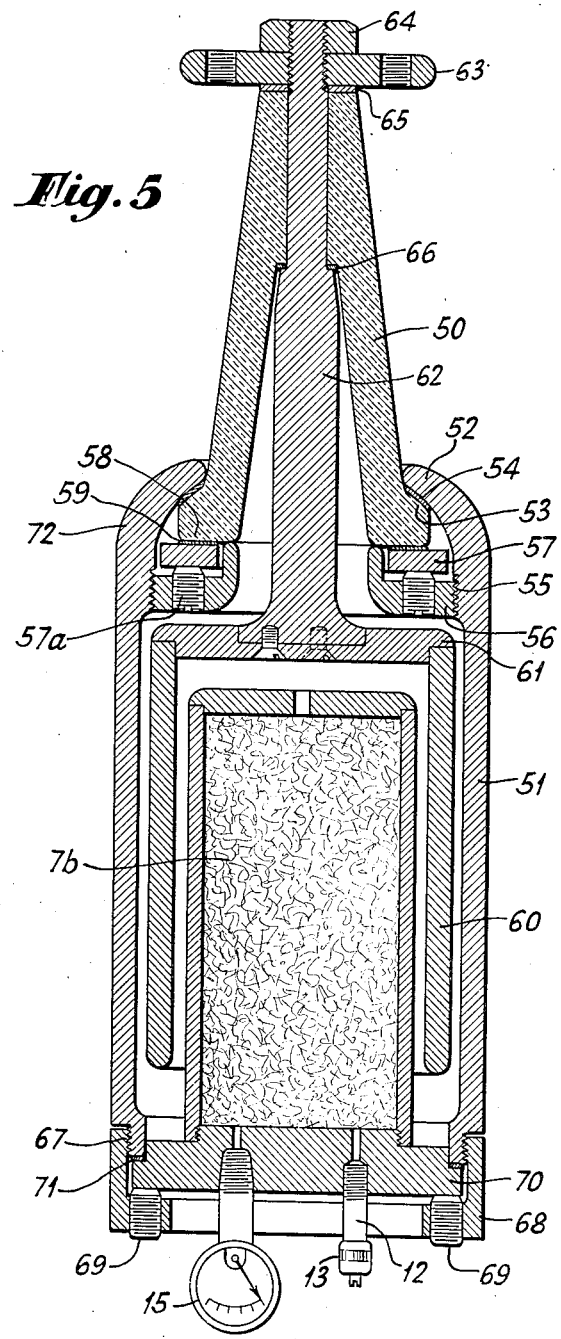
Fig. 5 is a longitudinal section of a preferred form of condenser.

Referring now in detail to Figs. 1 and 2 of the drawings, the outer casing 1 is composed of a suitable metal having high electrical conductivity, such as for example, copper, brass, aluminum or the like, having an internal aperture 1a which is accurately finished and polished so as to provide a suitable inner electrode surface and further to prevent corona due to brushing. The upper portion of casing 1 supports a hollow cone-like insulator 2 which is composed of any good insulating material, such as "Isolantite," "Pyrex," porcelain or the like. The lower portion of insulator 2 has a flange 2a over which a metallic ring 3 securely fastens the insulator to the casing by suitable screws 4. A lead gasket 5 or any other suitable gasket material is employed between members 1, 2 and 3 to prevent the leakage of air and mechanical breaking of the insulator. Within casing 1 and centrally secured to the bottom portion by threaded means 6a there is concentrically arranged a combined storage tank base plate and filter retaining means 6, the outer portion 6b being accurately finished and polished to provide a suitable electrode surface. A gasket 6c insures a fluid-tight joint. In the upper portion of member 6 there is provided a removable cap 7 having a small aperture 7a which is arranged to supply air from the inner chamber within member 6 to the inside of casing 1. The air supply within condenser electrode 6 is maintained at substantially the same pressure per square inch as the inside of the condenser proper. The air storage tank 6 is filled with cotton 7b or some suitable air filtering material. Interposed between the walls of casing 1 and combined air storage and filtering electrode 6 is a third skirt-like electrode 8 which may be retained fixed or provided with variable means, although for the sake of simplicity in this portion of the specification the electrode 8 is shown as concentrically arranged within the casing and supported by means of a terminal stud 9 which is threaded in the upper part of electrode 8, the upper portion of terminal stud 9 being provided with suitable washers 10 and nuts 11. A shoulder 11a on stem or terminal stud 9 and gasket 11b makes this joint air-tight. Casing 1 is equipped with an air valve 12 and cap 13, valve 12 being soldered to casing 1 at a point 14 to prevent leakage of the air within the casing. In order that the dielectric fluid within the casing which may be air, gas or compressed liquid under pressure may be accurately determined, a pressure gauge 15 is provided having a scale with indications from zero to 300 pounds pressure, the normal pressure of the fluid within the condenser being generally maintained from 150 to 200 pounds. At such a pressure, this condenser will be capable of efficiently handling approximately 30,000 volts R. M. S.

In the operation of this condenser, after the inner electrode surfaces have been thoroughly cleansed and the air storage tank 6 filled with suitable filtering material, air is pumped into the condenser through the valve 12 into tank 6, which acts as an air storage tank to make up for air leakage. Tank 6 usually contains the greater part of the air in the condenser. The small aperture 7a draws only enough air through to supply a flow leak so that in case of insulator breakage less damage will be done to the transmitter tubes and structure. The filtering material 7b prevents dust and moisture from collecting on the condenser electrode elements as moisture or dust on the condenser electrode surface lowers its breakdown voltage. Therefore, I have found that filtering out this moisture and dust greatly improves the voltage rating of the condenser and greatly extends its useful life.

The modification shown in Fig. 3 is generally similar to that just described in connection with Figs. 1 and 2, except that the storage tank 6 is divided at a point 16 so that it may be readily removed from base plate 17 by means of a threaded portion 18. Within the storage tank 6 there is assembled two porous pads 19 and 20 which may be composed of any suitable filtering material, such as felt. The space between members 19 and 20 may be provided with some suitable absorbent material, such as for example a calcium compound, such as chalk or dehydrated gypsum 21. Members 19 and 20 are arranged to fit closely within casing 6. Pad 19 is first inserted within the storage tank 6, then a sufficient amount of material 21 is poured in. Pad 20 is then pressed into tank 6 to form a filter, as shown by the drawings. After the condenser is assembled, any air pumped in to the inside walls of the condenser will be filtered so that substantially all of the dust and moisture will be removed, before it enters the dielectric space between the condenser electrodes. In order to facilitate the removal of cap 7, there is provided suitable means, such as holes 22 drilled partially through cap 7 in which a spanner wrench or other suitable device can be inserted to rotate cap 7.

The condenser arrangement shown in Fig. 4 is generally similar to that structure shown in the Hansell et al. D9865, except that the flexible metallic bellows portion 30 is located well above the movable electrode surface and within the confines of an insulator 31 which has a larger internal space to provide free movement of the bellows 30, the bellows 30 being retained on movable support member 32 and firmly secured to insulator 31 by means of a stud 33. The bellows 30 are subdivided by means of a plurality of washers 34 and adjustment of the condenser is accomplished by means of a slender rod-like member 35 extending within member 33, the variation in adjustment being made by rotating threaded member 36. A ball bearing 37 is provided at the end of rod 35 to insure smooth rotation. To provide a good seat for insulator 31 and also to insure a fluid tight joint, a casing 43 having a wall of substantial thickness is arranged at the upper portion to have a flanged end 44. A gasket 45 is interposed between insulator 31 and casing 43. As in Figs. 1 and 2, the combined storage tank base plate and filtering retaining means 6 is accurately finished and polished to provide a suitable electrode surface 6b, the lower portion being provided with a shoulder portion and being threaded at 6a, a fluid-tight joint being provided by means of a lead gasket 6c. Electric connection to the condenser is made by means of a lug 38, the other connection being made to any suitable portion on the outside surface of casing 1. Casing 1 is also provided with a valve 39, cap 40 and pressure gauge 41.

The preferred modification shown in Fig. 5 is generally similar to the condensers with fluid filtering means, as shown in Figs. 2 and 3, except that the insulator and casing (shown in Fig. 2) is modified to provide a rigid stream-lined type of structure, the casing having a new and novel internal arrangement to secure the insulator in a fluid-tight engagement therewith. This arrangement is accomplished by providing insulator 50 with a tapered shoulder 52 which bears against a corresponding tapered shoulder 53 within the inside walls of the upper portion of casing 51. A lead gasket 54 is provided to prevent leakage of the internal fluid, also, entry of air and moisture from the outside atmosphere. Casing 51 is threaded at 55 to receive an insulator retaining member 56 which bears against the lower portion of insulator 50 during assembly. Member 56 is provided with threaded means comprising a plurality of adjusting screws 57a which are arranged so as to apply pressure between casing 51 and insulator 50 by a clamp ring 57 which bears against the base portion 58 of insulator 50. To prevent air leakage and also damage to the insulator, a lead gasket 59 is interposed between insulator 50 and clamp ring 57. The intermediate electrode 60 is supported on insulator 50 by means of disc 61, stem 62, terminal washer 63 and a clamp nut 64. Gaskets 65 and 66 prevent mechanical injury to the insulator and leakage of the compressed fluid within the condenser. Although electrode 60 is shown as composed of several parts, it could well be arranged as comprising a combination of stem 62, disc 61 and skirt 60 as an integral member. The lower portion of casing 51 is threaded at 67 to receive a base clamping ring 68 having a plurality of clamping screws 69 which forces base plate 70 against the lower end of casing 51. A suitable gasket 71 is interposed between plate 70 and casing 51. It will be noted from the drawings that in this preferred modification, the casing presents a relatively smooth external surface. Also, to prevent brushing, the upper portion of casing 51 is rounded over at 72 and the insulator has a relatively long narrow cone-shape which provides a large electrical creepage surface. A condenser of this type is particularly desirable for use in ultra high frequency circuits and is capable of withstanding 30,000 peak volts for a relatively long period.

While Figs. 1 to 5 inclusive show only a few applications of compressed air condensers having combined storage tank and filtering means, it is to be distinctly understood that these principles may also be applied to other forms of compressed air condensers. Therefore, this invention should only be limited to such limitations as those clearly imposed in the appended claims.

What is claimed is:

1. An electric condenser having two electrodes spaced apart from each other, one of said electrodes forming a casing with concentric walls, a second electrode supported within said casing by an insulator and interposed between the concentric walls of said first electrode, the innermost wall of said first mentioned electrode forming an air storage tank, and filtering means for filtering said fluid within the innermost wall of said casing before it reaches the space interposed between said electrodes.

2. A compressed air condenser comprising a casing electrode the inner surface of which acts as one electrode of the condenser, an insulator secured to said casing, a second electrode supported within said casing by said insulator, and an air storage tank supported within said casing and secured to the base of the casing, the outer surface of said storage tank acting with said casing electrode and in cooperation with said second electrode to increase its active capacitive area, and filtering means within said air storage tank for filtering said fluid before it reaches the space between said electrodes.

3. A compressed air condenser comprising a casing electrode the inner surface of which acts as one electrode of the condenser, an insulator secured to said casing, a second electrode supported within said casing by said insulator, an air storage tank supported within said casing and secured to the base of the casing, the outer surface of said storage tank acting with said casing electrode and in cooperation with said second electrode to increase its active capacitive area, and filtering means within said air storage tank including cotton for filtering said fluid before it reaches the space between said electrodes.

4. An electric condenser having two electrodes spaced apart from each other, one of said electrodes forming a casing, the other electrode being located within said casing, a fluid dielectric interposed between said electrodes, means within said casing for filtering said fluid before it reaches the space between said electrodes, and variable means associated with said other electrode for varying the capacity of said condenser comprising a plurality of flexible metallic bellows.

5. A variable electric condenser comprising a metallic casing, said casing acting as one electrode of the condenser, an insulator supported by and secured to said casing, a central electrode secured to said insulator within said casing, said central electrode having fixed and movable portions comprising a plurality of flexible bellows, the major portion of which is located within the confines of said insulator and interposed between and secured to said fixed portion and movable portions of said central electrode, means comprising a rod-like member centrally located within said flexible bellows and cooperating with an externally located adjusting member to vary the position of said central electrode with respect to said casing electrode, the space between the electrodes being filled with a gas under pressure acting as a dielectric for said condenser.

6. An electric condenser having two electrodes spaced apart from each other, one of said electrodes forming a casing, the other electrode being located within said casing, a fluid dielectric interposed between said electrodes, a fluid storage tank supported by and located within said casing, said tank being secured to a removable base for said casing, a fluid filling valve and pressure gauge attached to said casing, means within said casing comprising filtering material of felt discs, and a calcium compound interposed between said discs for filtering said fluid before it reaches the space between said electrodes.

7. A variable electric condenser comprising a metallic casing, said casing acting as one electrode of the condenser, an insulator supported by and secured to said casing, a central electrode secured to said insulator within said casing, said central electrode having fixed and movable portions comprising a plurality of flexible bellows, the major portion of which is located within the confines of said insulator and interposed between and secured to said fixed portion and movable portions of said central electrode, means comprising a rod-like member centrally located within said flexible bellows and cooperating with an externally located adjusting member to vary the position of said central electrode with respect to said casing electrode, the space between the electrodes being filled with a gas under pressure acting as a dielectric for said condenser, and means attached to said casing for replenishing and filtering the gas supplied to the condenser.

8. A variable electric condenser comprising a metallic casing, said casing acting as one electrode of the condenser, an insulator supported by and secured to said casing, a central electrode secured to said insulator within said casing, said central electrode having fixed and movable portions comprising a plurality of flexible bellows the major portion of which is located within the confines of said insulator and interposed between and secured to said fixed portion and movable portions of said central electrode, means comprising a rod-like member centrally located within said flexible bellows and cooperating with an externally located adjusting member to vary the position of said central electrode with respect to said casing electrode, the space between the electrodes being occupied by a gas under pressure acting as a dielectric for said condenser, and means including a storage tank located within said casing for replenishing and filtering the gas supplied to said condenser.

9. A compressed air condenser comprising a casing the inner surface of which acts as one electrode of the condenser, an insulator secured to said casing by an internal clamping member, a second electrode supported by said insulator, an air storage tank supported within said casing and secured to the base of the casing, the outer surface of said storage tank also acts with said first mentioned electrode in cooperation with said second electrode to increase the active capacitive area of said condenser, and filtering means within said air storage tank.

10. A compressed air condenser comprising a casing the inner surface of which acts as one electrode of the condenser, an insulator extending through the upper portion of said casing, a second electrode supported by said insulator, means within said casing for clamping said insulator to said casing, an air storage tank supported within said casing and secured to the base of the casing, the outer surface of said storage tank also acts with said first mentioned electrode in cooperation with said second electrode to increase the active capacitive area of said condenser, and filtering means within said air storage tank.

11. An electric condenser having at least two electrodes spaced apart from each other with an interposed fluid dielectric, one of said electrodes forming the casing of said condenser and having concentric walls, the other electrode interposed between the concentric walls and supported by an insulator from said casing, the innermost concentric wall of said casing forming a storage fluid space, means in said storage tank for communication of said fluid within the outside and the space between said electrodes, and filtering means within said storage space for filtering said fluid dielectric entering from the outside before reaching the space between said electrodes.

12. An electric condenser having at least two electrodes spaced apart from each other with an interposed fluid dielectric, one of said electrodes forming the casing of said condenser and having concentric walls, the other electrode interposed between the concentric walls and supported by an insulator from said casing, the innermost concentric wall of said casing forming a storage fluid space, means in said storage tank for communication of said fluid within the outside and the space between said electrodes, and filtering means within said storage space for filtering said fluid dielectric including a plurality of filtering discs located within said storage space whereby the fluid is filtered before it reaches the space between said electrodes.

GEORGE L. USSELMAN.